United States Patent [19]
Tanaka et al.

[11] Patent Number: 5,622,743
[45] Date of Patent: Apr. 22, 1997

[54] STABILIZING AGENT FOR BEER

[75] Inventors: Masanori Tanaka; Kinichi Ono; Tatsuji Morimoto; Akira Kamon, all of Tokyo, Japan

[73] Assignees: Mizusawa Industrial Chemicals, Ltd.; Sapporo Breweries Limited, both of Tokyo, Japan

[21] Appl. No.: 444,280

[22] Filed: May 18, 1995

[30] Foreign Application Priority Data

May 18, 1994 [JP] Japan .................................. 6-104033

[51] Int. Cl.$^6$ ................................................ C12H 1/052
[52] U.S. Cl. ............................. 426/330.4; 426/330.5; 426/423; 252/313.2; 423/338; 502/407
[58] Field of Search ..................... 252/313.2; 426/330.4, 426/330.6, 423, 330.5; 423/338; 502/405, 407

[56] References Cited

U.S. PATENT DOCUMENTS

| | | | |
|---|---|---|---|
| 4,515,821 | 5/1985 | Armstead et al. | 426/330.4 |
| 4,636,394 | 1/1987 | Hsu | 426/330.4 |
| 4,975,405 | 12/1990 | Okamura et al. | 502/407 |

FOREIGN PATENT DOCUMENTS 1279250  6/1972  United Kingdom .

OTHER PUBLICATIONS

Zhuravlev, L. T., "Concentration of Hydroxyl Groups on the Surface of Amorphous Silica", Langmuir 1987, vol. 3, No. 3, pp. 316–318.

Conley, Robert T., *Infrared Spectroscopy Second Edition*, Allyn and Bacon, Inc., Boston, Mass. (1972) pp. 188–195.

*Primary Examiner*—Richard D. Lovering
*Assistant Examiner*—Daniel S. Metzmaier
*Attorney, Agent, or Firm*—Sherman and Shalloway

[57] ABSTRACT

A stabilizing agent for beer comprising a particular amorphous silica exhibiting a large negative zeta-potential in the pH region of the beer. The amorphous silica is of the xerogel type and has a specific surface area of from 100 to 600 m$^2$/g, a porous volume of 1 to 2 cc/g, and OH groups in a number of not larger than 7/nm$^2$ on the silica surface, and an aqueous suspension thereof exhibits a pH of from 4 to 6.2 and a zeta-potential of negative polarity, the absolute value thereof being not smaller than 20 mV. When used as a stabilizing agent for beer, the amorphous particulate silica effectively removes the haze since the aqueous suspension thereof exhibits a weakly acidic pH which is close to that of the beer and a large negative zeta-potential, and helps improve froth-holding property and fragrance-retaining property of the beer.

14 Claims, 5 Drawing Sheets

FIG. 2 INFRARED-RAY ABSORPTION SPECTRUM

RELATIONSHIP BETWEEN THE pH AND THE ZETA-POTENTIAL

INFRARED-RAY ABSORPTION SPECTRUM
$\lambda / cm^{-1}$

STABILIZING AGENT FOR BEER

BACKGROUND OF THE INVENTION

1. Field of the Invention

The present invention relates to a stabilizing agent for beer comprising particular amorphous silica and, more specifically, to a stabilizing agent for beer comprising amorphous silica that exhibits a large negative zeta-potential in the pH region of the beer.

2. Prior Art

Beer is a transparent alcoholic beverage exhibiting shiny amber color and is a fermentation product obtained by fermenting the malt of barley and hop as main starting materials and recovering the product therefrom. In addition to taste, fragrance and flavor as an alcoholic beverage, therefore, appearance also serves as an important factor that determines commercial value.

When the beer is preserved for extended periods of time being bottled, canned or contained in barrels and when it is chilled to drink, there often takes place haze phenomenon in which dregs and haze occurs in the beer and the beer becomes turbid. The beer which occurs haze is regarded to be the one that has poor durability and is not, therefore, appreciated and besides lacks commercial value of the beer.

The haze can be divided into three cases; i.e., cold haze, permanent haze and freeze haze. It has been reported that the beer contains cold haze in an amount of from 1.4 to 8.1 mg/l and permanent haze in an amount of from 6.6 to 14.1 mg/l. It has also been reported that the haze occurs in the order of from 44 to 100 mg/l.

The cold haze occurs when the beer is chilled at about 0° C. and dissolves again at a temperature of 20° C. The permanent haze is also called oxidized haze but does not dissolve again. The freeze haze occurs when the beer is frozen or is chilled to about −5° C. which is close to freezing.

It has been said that the beer becomes turbid when part of proteins derived from the barley and hop that are the starting materials and soluble components such as polyphenol and the like become insoluble or when these colloidal components associate with each other.

In this specification, the components which are dissolved in the beer or are decomposed therein in a colloidal form and become causes of turbidity when the beer is preserved for extended periods of time or is chilled, are referred to as turbidity precursors.

As described above, haze in the beer stems from the turbidity precursors that ubiquitously exist in the beer and as far as the turbidity precursors remain in the beer, occurrence of haze cannot be extinguished though it may vary depending upon the conditions at that time.

Therefore, a variety of methods (stabilizing treatments) have been put into practice for preventing the beer from becoming turbid and efforts have been made to prevent the beer from degenerating and to improve durability by removing the turbidity precursors remaining in the beer applying various methods and technologies.

Turbidity precursors have heretofore been separated and removed by adding to the beer such haze preventing agents as papain (vegetable albumin decomposing enzyme recovered from papaia), tannic acid, polyvinyl pyrrolidone, silica gel, etc.

In particular, the silica gel has been extensively used as a stabilizing agent since it little affects the quality of the beer such as, fragrance, taste, favor, froth and the like.

As the silica gel (amorphous silica) for stabilizing the beer, it has heretofore been known to use a hydrogel or a xerogel. Japanese Patent Publication No. 61914/1988 discloses the use of silica hydrogel particles having a water content of 60 to 90% by weight and a BET specific surface area of not smaller than 300 m²/g obtained by the reaction of an acidic silica sol with sodium silicate in the presence of an aqueous solution of salts, for stabilizing the beer.

Japanese Patent Publication No. 27483/1991 discloses a water-containing gel for stabilizing the beer having a specific surface area of from 530 to 720 m²/g, a porous volume of from 0.9 to 1.5 ml/g, an average porous diameter of from 50 to 120 angstroms, a water content of from 7 to 25% and a pH of from 6.0 to 8.0 when it is suspended in the water at a concentration of 5%.

Moreover, Japanese Patent Publication No. 38188/1988 discloses a method of treating beer by bringing a fired silica xerogel into contact with the beer, the fired silica xerogel having a surface area over a range of from 100 m²/g to 450 m²/g, a porous volume of at least 0.66 cc/g, an average porous diameter of not smaller than 100 angstroms, exhibiting a peak at 3760 cm⁻¹ in the infrared-ray spectrum indicting the presence of a single surface silanol group, and exhibiting a ratio of absorbance at 3760 cm⁻¹ to the absorbance at 1890 cm⁻¹ of not smaller than 2.2, and then separating the silica from the beer.

According to the above-mentioned method of using the silica hydrogel or the water-containing gel, microorganisms such as molds often proliferate during the production of the gel, during the preservation or during the transit. When an acid is added to the gel to prevent the proliferation, however, the acid often infiltrates into the beer.

The latter method of using the fired xerogel which is one of the above-mentioned prior methods is meaningful from the standpoint of eliminating inconveniences of when the hydrogel or the water-containing gel is used. According to the study by the present inventors, however, it was learned that an infrared absorption peak at a wave number of 3760 cm⁻¹ is specific to the type-A silica gel having a very large specific surface area but the type-B silica gel used in the present invention does not at all exhibit the above infrared absorption peak.

SUMMARY OF THE INVENTION

The present inventors have discovered the fact that the amorphous silica of which the aqueous suspension has a pH which lies in a weakly acidic pH region like that of the beer and of which the aqueous suspension produces a zeta-potential of negative polarity having an absolute value of not smaller than 20 mV, is effective in removing the turbidity precursors without deteriorating the froth-holding property of the beer.

The object of the present invention is to provide a stabilizing agent for beer comprising amorphous silica which is easy to handle and is capable of effectively removing turbidity precursors that develop during the cold storage while maintaining the froth-holding property of the beer at an excellent level.

According to the present invention, there is provided a stabilizing agent for beer comprising amorphous silica having a composition represented by the following formula $$aM_{2/m}O \cdot SiO_2 \cdot nH_2O \qquad (A)$$

wherein M denotes an alkali metal and/or an alkaline earth metal, m is a valency of a metal M, a is a number of from 0 to $5\times10^{-3}$ and, particularly, from 0 to $3\times10^{-3}$, and n is a number of from 0 to 0.2 and, particularly, from 0 to 0.125, having a specific surface area of from 100 to 600 m²/g and, particularly, from 250 to 550 m²/g and a porous volume of from 1.0 to 2.0 cc/g and, particularly, from 1.0 to 1.6 cc/g, and further having an absorbancy ratio ($R_A$) as defined by the following formula $$R_A = I_{970}/I_{1100} \qquad (1)$$

wherein $I_{970}$ is a peak absorbancy at a wave number of 970 cm$^{-1}$ in an infrared-ray absorption spectrum, and $I_{1100}$ is a peak absorbancy at a wave number of 1100 cm$^{-1}$ in the infrared-ray absorption spectrum, of not smaller than 0.02 but smaller than 0.20 and, particularly, not larger than 0.15, an aqueous suspension of said amorphous silica at a concentration of 1000 ppm and at a temperature of 25° C. exhibiting a pH of from 4 to 6.2 and, particularly, from 5 to 6.0 and producing a zeta-potential of negative polarity having an absolute value of not smaller than 20 mV and, particularly, not smaller than 30 mV.

According to the present invention, furthermore, there is provided a stabilizing agent for beer which is reformed and has OH groups on the surface of the amorphous silica in a number of not larger than 7/nm² and, preferably, not larger than 6/nm², the surface thereof being allowed to be little converted into OH groups even in an aqueous dispersion system.

According to the present invention, there is further provided a stabilizing agent for beer wherein the amorphous silica has a median diameter of from 5 to 8 μm and, particularly, from 5.5 to 7 μm as measured by the Coulter counter method, and has a number distribution of fine secondary particles of not larger than 2.6 μm of from 30 to 60%.

DETAILED DESCRIPTION OF THE INVENTION

The amorphous silica used in the present invention has a chemical composition represented by the above-mentioned formula (A) and has a feature in that it contains water in an amount of not larger than 0.2 mol, preferably, not larger than 0.14 mol and, particularly preferably, not larger than 0.125 mol per mol of the silica, suppresses the proliferation of microorganisms such as molds, etc. during the production, preservation or transit, and makes itself easy to be handled. The amorphous silica may further contain alkali metal components such as Na, K and the like as well as alkaline earth metal components such as Ca, Mg and the like in amounts of not more than $5\times10^{-3}$ mol and, particularly, not more than $3\times10^{-3}$ per mol of $SiO_2$, so that they will not elute into the beer and will not deteriorate fragrance.

The amorphous silica used in the present invention has a distinguished feature in that an aqueous suspension thereof at a concentration of 1000 ppm at a temperature of 25° C. exhibits a pH of from 4 to 6.2 and, particularly, from 5 to 6.0 and produces a zeta-potential of negative polarity having an absolute value of not smaller than 20 mV and, particularly, not smaller than 30 mV.

First, the amorphous silica used in the present invention exhibits a weakly acidic pH which is close to the pH (3.5 to 5.0) of a beer when it is in the form of an aqueous suspension of a low concentration (1000 ppm) which is practically used for stabilization-treating the beer. This means that components contained in the amorphous silica elute little and do not deteriorate fragrance-retaining property.

Besides, according to the present invention, fine amorphous silica particles in the form of an aqueous suspension exhibit zeta-potential of negative polarity having an absolute value that lies in the above-mentioned range, contributing to markedly improving the cold durability of the beer yet favorably maintaining the froth of the beer. Reference should be made to Table 1 appearing later. There exists a close relationship between the zeta-potential of the amorphous silica and the cold durability of the beer after treated, from which it will be obvious that the cold durability increases with an increase in the absolute value of the zeta-potential which has the negative polarity.

It is said that cold haze is formed in the beer due to oxidation polymerization of proteins with polyphenol in the beer. According to the present invention, however, the amorphous silica helps produce a high zeta-potential of negative polarity and effectively adsorbs proteinous colloidal particles which are positively charged, making it possible to prevent the formation of cold haze.

Figure 1:
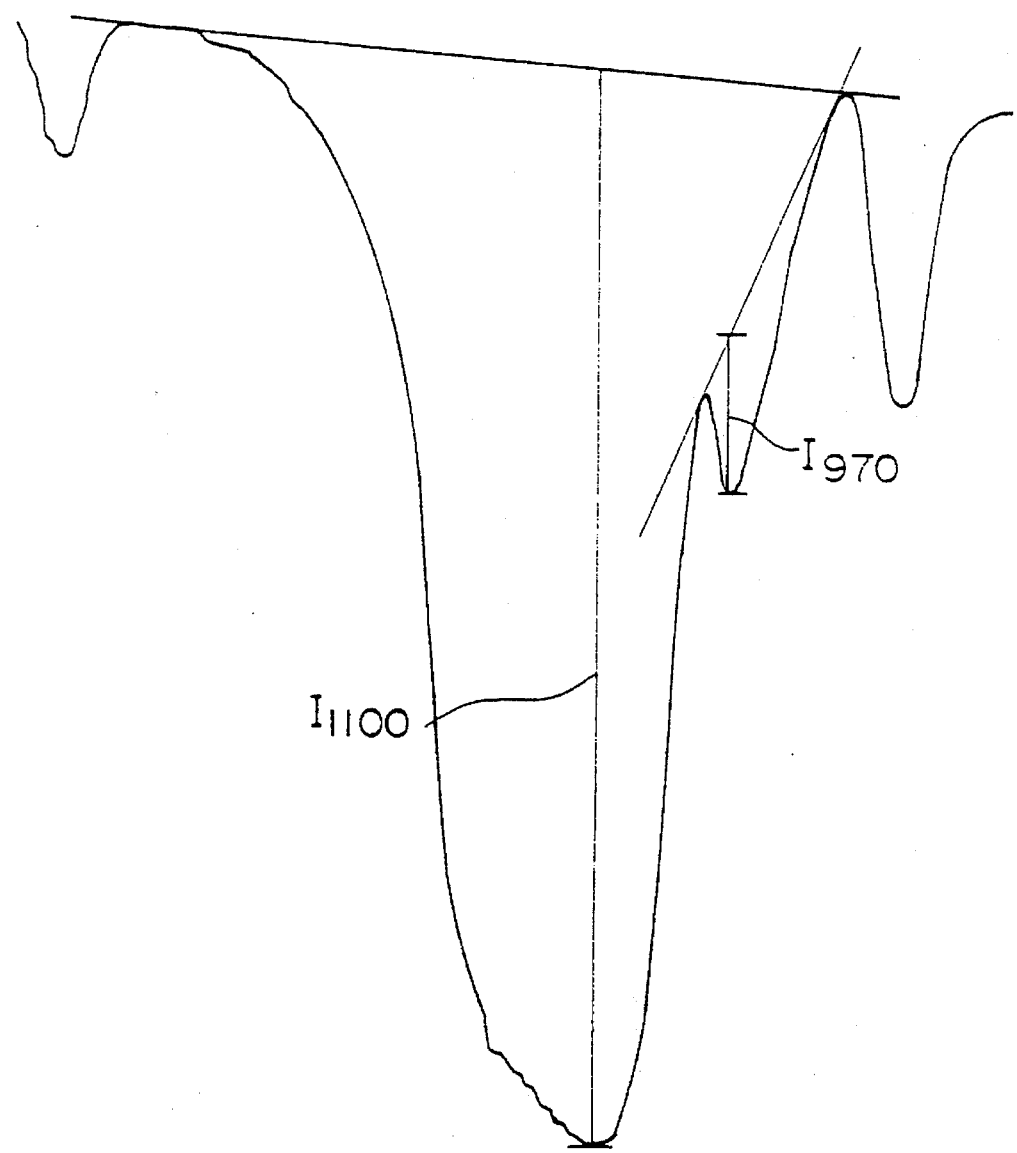
FIG. 1 illustrates a method of measuring a peak absorption for calculating the value $R_A$ of the formula (1) from an infrared-ray absorption spectrum.

To obtain the zeta-potential specified by the present invention, it was learned that the amorphous silica must have a chemical composition that lies within the above-mentioned range and must further have an absorbancy ratio ($R_A$) specified by the above-mentioned formula (1) which is not smaller than 0.02 but is smaller than 0.20 and, particularly, not larger than 0.15. As shown in FIG. 1, the absorbancy ratio ($R_A$) can be calculated by finding the absorbencies $I_{970}$ and $I_{1100}$ from the infrared-ray absorption spectrum.

Figure 2:
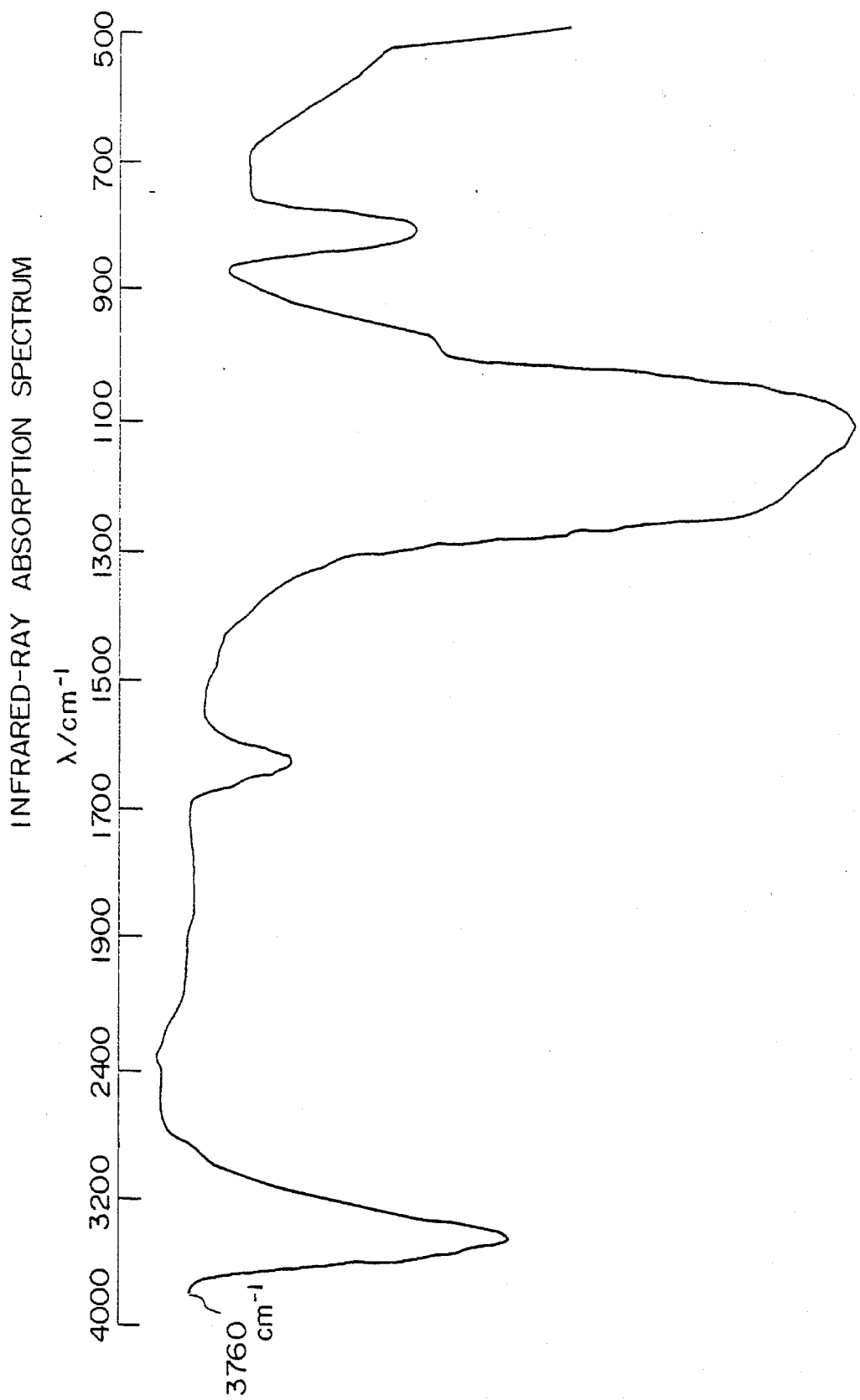
FIG. 2 illustrates an infrared-ray absorption spectrum over the whole region of a representative amorphous silica of the present invention.

FIG. 2 shows an infrared-ray absorption spectrum of a representative amorphous silica used in the present invention. From FIG. 2, it will be learned that the amorphous silica does not at all exhibit absorption at a wave number of 3760 cm$^{-1}$ but exhibits a large absorption at a wave number of 1100 cm$^{-1}$ and a small absorption at a wave number of 970 cm$^{-1}$.

It is considered that the characteristic absorption at the wave number of 1100 cm$^{-1}$ is based on the elongation-contraction vibration of Si-O and the characteristic absorption at the wave number of 970 cm$^{-1}$ is based on the elongation-contraction vibration of Si-OH.

Figure 3:
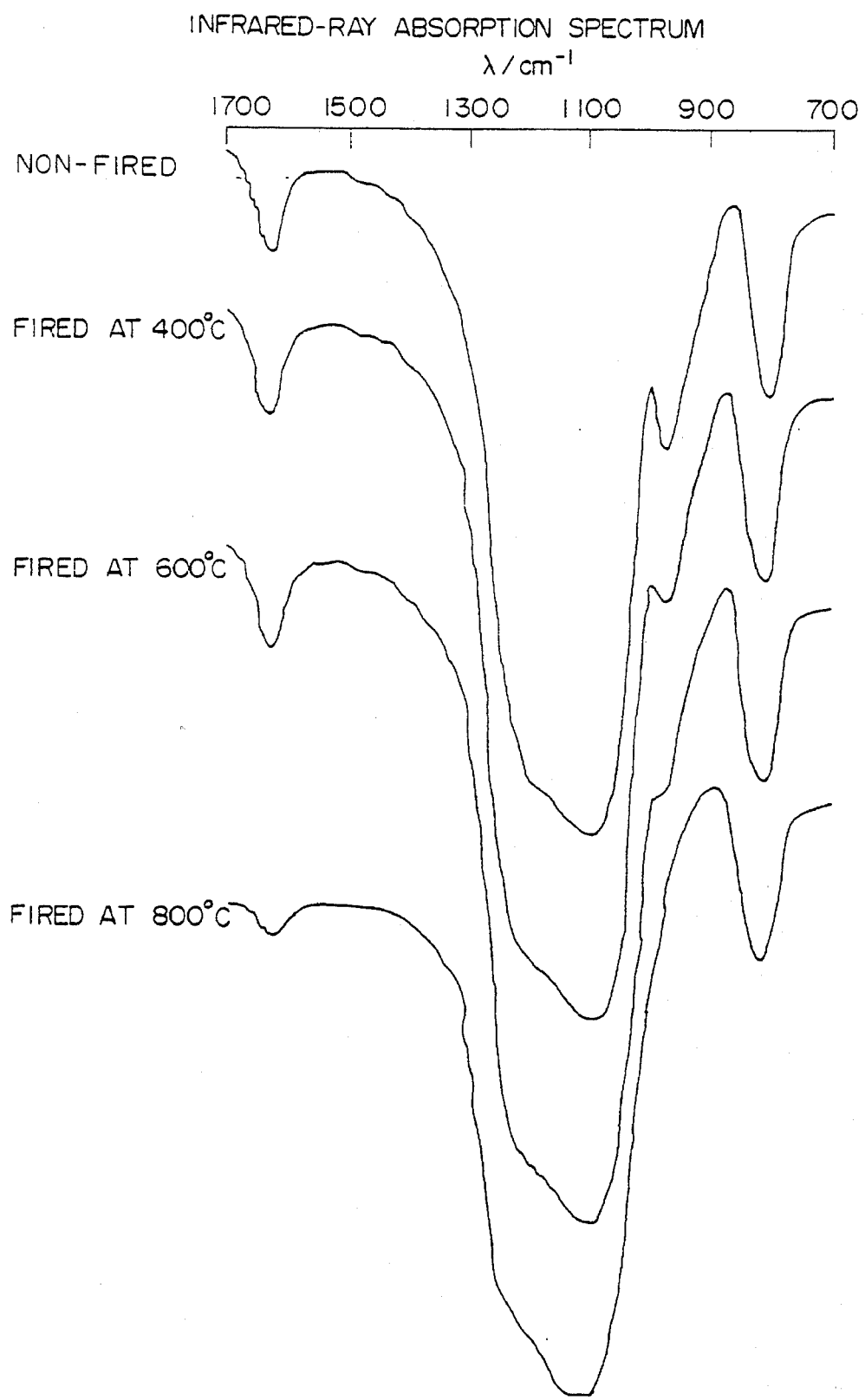
FIG. 3 illustrates temperatures for firing the amorphous silica and changes in the infrared-ray absorption spectra near 1000 cm$^{-1}$.

FIG. 3 shows changes in the characteristic absorption of when the type-B amorphous silica is fired at different temperatures, from which it will be obvious that the absorption at the wave number of 970 cm$^{-1}$ decreases with an increase in the firing temperature and the absorption extinguishes when the amorphous silica is fired at 800° C.

According to the present invention, the amorphous silica is heat-treated in a manner that the absorbancy ratio ($R_A$) lies within the above-mentioned range, so that the zeta-potential is produced within a range as contemplated by the present invention.

Figure 4:
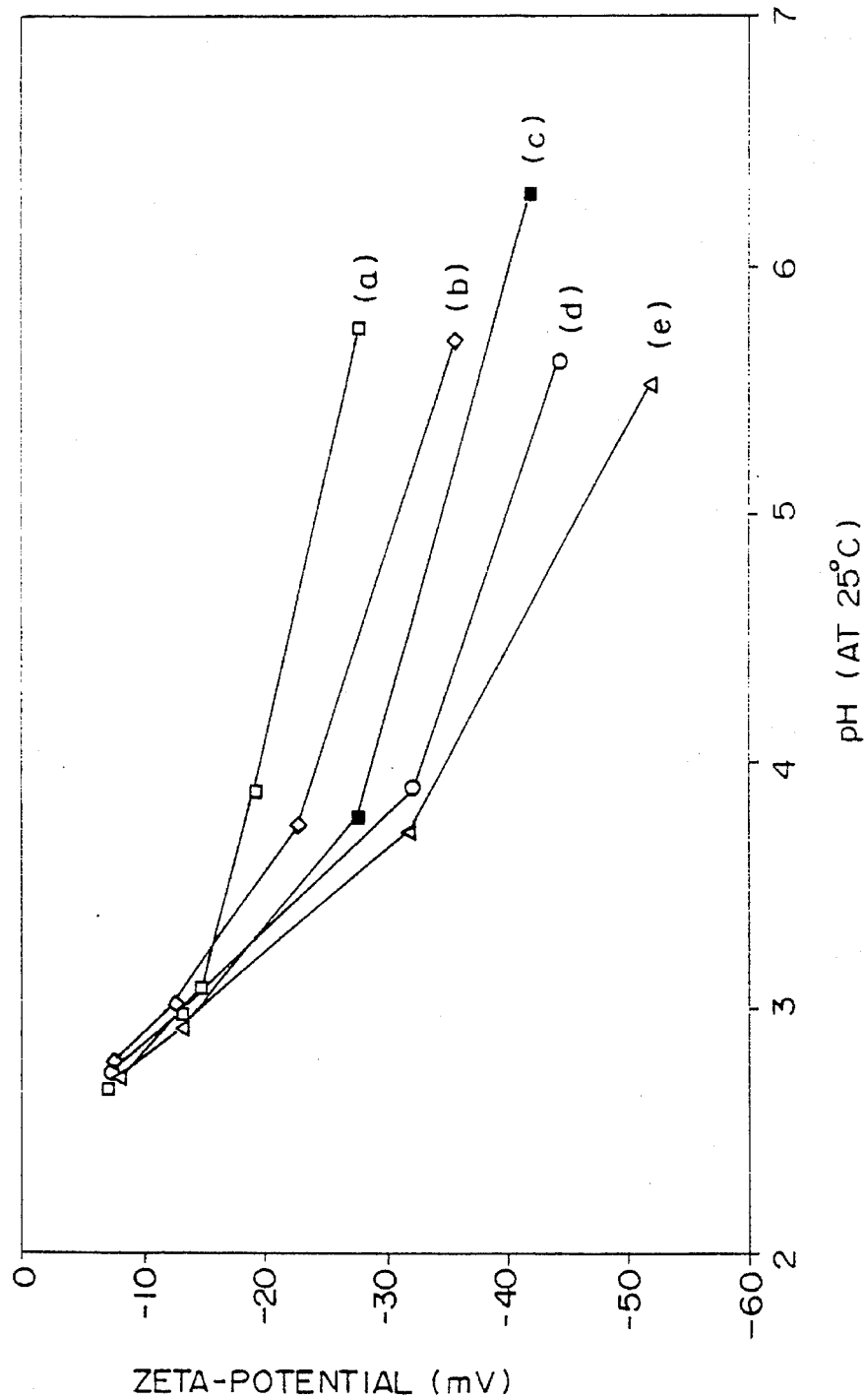
FIG. 4 illustrates a relationship between the pH of aqueous suspension of various kinds of amorphous silica and the zeta-potential.

With reference to the accompanying FIG. 4, the origins of pH values and zeta-potentials are those of conventional amorphous silica which are stabilizing agents for the beer and of the amorphous silica used in the present invention of when they are suspended in the water at a concentration of 1000 ppm at 25° C., wherein the zeta-potentials undergo changes when the pH of the suspension is shifted toward the acidic side by the addition of hydrochloric acid.

In FIG. 4, a line a (sample No. H-1) represents that of a conventional hydrogel type, and lines b (sample No. 1), d (sample No. 2) and e (sample No. 3) represent those of the xerogel type of the present invention, and a line c (sample No. H-3) represents that of a conventional xerogel type that is placed in the market. What can be particularly said from FIG. 4 is that the original pH values of the amorphous silica of the present invention are all smaller than 6 and, particularly, smaller than 5.7, i.e., b=5.78, d=5.6 and e=5.5, which are closer to the above-mentioned pH value of the beer than c=6.27 of the conventional product.

It can be further said that the zeta-potentials of d and e of the present invention encompass the pH region of the beer not only at the origins but also up to the pH of 3.5 maintaining negative polarity at all times and the absolute value thereof stably changing but being larger than 30 mV.

Though the details have not been known yet, the amorphous silica particles according to the present invention are negatively charged over a wide acidic pH region as shown in FIG. 4 compared with the conventional stabilizing agents for beer of the xerogel type presumably because of the number of OH groups on the silica surfaces (7 OH groups/$nm^2$ or less and, particularly 6 OH groups/$nm^2$ or less) which is smaller than that of the conventional silica and, besides, the silanol groups on the silica surfaces are stabilized and are not easily converted into OH groups, in addition to difference in the structural factors as represented by pore distribution, porous volume, specific surface area, etc.

As for other properties required for the amorphous silica for stabilizing the beer, the specific surface area should be from 100 to 600 $m^2/g$ and, particularly, from 250 to 550 $m^2/g$. When the specific surface area is smaller than the above-mentioned range, the cold haze precursors are not removed to a sufficient degree. When the specific surface area is larger than the above-mentioned range, on the other hand, fragrance components are adsorbed deteriorating fragrance-retaining property of the beer after the treatment.

The porous volume should be from 1.0 to 2.0 cc/g and, particularly, from 1.0 to 1.6 cc/g. When the porous volume is smaller than the above-mentioned range, the cold haze precursors are not removed to a sufficient degree. When the porous volume is larger than the above-mentioned range, on the other hand, the froth-holding property of the beer is deteriorated after the treatment.

Moreover, the amorphous silica should have a median diameter (volume basis, in accordance with the Coulter counter method) of from 5.0 to 8.0μ and, particularly, from 5.5 to 7.0 μm. When the particle diameter is smaller than the above-mentioned range, the particles coagulate. When the particle diameter is larger than the above-mentioned range, on the other hand, the particles are not dispersed to a sufficient degree and the efficiency for adsorbing and trapping haze precursors decreases.

According to the present invention, furthermore, another feature resides in that fine secondary particles of smaller than 2.6 μm as measured by the Coulter method are agglomerating in a number distribution over a range of from 30 to 60% surrounding the large particles, in addition to the possession of relatively large median diameter mentioned above.

In the practical treatment for settling the haze of beer, it is desired that the silica be added in amounts as small as possible and that the treating time is as short as possible. In the aqueous dispersion system, therefore, it is presumed that the negatively charged fine particles of the present invention are quickly dispersed being electrically repelled by the negatively charged large particles, enabling the speed of haze settlement to be quickened.

The stabilizing agent for beer of the present invention is a hydro- or xerosilica gel which can be produced by a variety of methods, and is the one that is prepared by so heat-treating, as a starting material, the silica gel that is qualified as the standard of silicon dioxide (silica gel) disclosed in "Food Additives Regulations" D-681 that it exhibits a particular absorbancy ratio ($R_A$) and a zeta-potential. There can be exemplified, for instance, the following method.

According to a general method of producing silica gel, an alkali silicate and a mineral acid which are starting materials are neutralization-reacted upon being contact-mixed together to form a hydrogel thereof which is then ground and aged. Then, after salts by-produced by the above-mentioned reaction are removed by washing, the hydrogel is dried, heat-treated, pulverized and is classified.

As the alkali silicate which is the starting material, there can be used a sodium silicate or a potassium silicate of water glass that is specified as industrial products under JIS, or an alkali silicate obtained by reacting a reactive silica recovered from clay materials such as montmorillonite clay with a solution of a hydroxide of an alkali metal.

The mineral acid used for the neutralization reaction will generally be hydrochloric acid or sulfuric acid, but it is also allowable to use a mixed acid thereof.

In the neutralization reaction in which the two starting materials in the form of aqueous solutions or aqueous dispersions are brought into contact with each other, either one of the two starting materials may be added to the other starting material with stirring, or aqueous solutions of the two starting materials may be simultaneously brought into contact under predetermined conditions.

In either case, in order that the specific surface area of the silica gel lies within a range of the present invention, it is desired that the pH of the reaction mixture is adjusted on the acidic side.

Reaction conditions for adjusting physical properties such as specific surface area, porous volume, etc. of the silica gel to lie within desired ranges, can be easily determined by preliminary experiments.

In general, the hydrosilica gel or the xerosilica gel prepared according to the above-mentioned method is subjected to the hydrothermal treatment at 100° to 140° C. for a predetermined period of time in order to adjust the specific surface area and porous volume of the silica gel.

After the hydrothermal treatment, the silica gel is dried, heated, pulverized and is classified so as to possess the aforementioned particle size. The pulverization and classification may be effected after the drying but prior to the heat-treatment.

The silica gel should be heat-treated so as to satisfy the composition of the above-mentioned formula (A), absorbancy ratio ($R_A$) of the above-mentioned formula (1) and the above-mentioned zeta-potential. The temperature for heat-treatment is usually from 120° to 1000° C., particularly, from 150° to 900° C. and, most desirably, from 200° to 800° C. though it may vary depending upon the specific surface area of the silica. The time for heat-treatment is usually selected over a range of from several seconds to several hours so as to satisfy the above-mentioned requirements though it may very depending upon the temperature and the method of firing.

The heat treatment can be carried out by using an electric furnace, a rotary kiln or a hot air flash firing furnace of the type of fixed bed or moving bed, or by using a heat-treating apparatus of the type of fluidized bed.

According to the present invention, furthermore, the surface of the silica may be reformed by secondarily depositing alkali metals such as sodium, potassium and the like and/or alkaline earth metal components such as calcium, magnesium and the like on the surface of the silica to decrease the number of OH groups on the surface followed by, as required, by the heat treatment. In this case, it is desired that a in the above-mentioned formula (A) is a number of not larger than $5 \times 10^{-3}$ from the standpoint of pH and elution into the beer.

According to the present invention, the amorphous silica is added as a stabilizing agent to the beer in an amount of the order of 50 to 1000 ppm with respect to the beer though it may vary depending upon the kind of beer, fermentation conditions and production conditions.

EXAMPLES

According to the present invention, the amorphous silica which is a stabilizing agent for beer is prepared as described below.

Preparation of silica hydrogel

Sodium silicate ($SiO_2$ 22.38%, $Na_2O$ 7.10%, SG 1.294/15° C.) in compliance with JIS and a sulfuric acid solution of a concentration of 45% (specific gravity 1.352/15° C.) were used as starting materials at a volume ratio of 4:1, fed simultaneously into an apparatus which is capable of bringing them into flash contact with each other, and were reacted at 30° to 35° C. while adjusting the pH of the reaction system to be 2.0 to 2.2 to form silica which was then aged under the same conditions for two hours and from which a silica hydrogel was recovered.

The aged silica hydrogel was ground into a size of 2 to 5 mm, and was washed with the water to obtain a hydrogel (sample SG-1) containing 68.5% of water.

The hydrogel was dispersed again in the water, subjected to the hydrothermal treatment at 120° C. for 4 hours, and was dried at 110° C. pulverized and classified to obtain a fine silica gel powder (sample No. SG-110).

Examples 1 to 3

Samples Nos. 1, 2 and 3 were prepared by heat-treating the sample No. SG-110 prepared as described above at 200° C. 400° C. and 600° C. each for one hour and were evaluated for their properties and for their use as stabilizing agents for beer in accordance with the testing methods described below. The results were as shown in Table 1.

Example 4

The sample SG-1 was dispersed again in the water, subjected to the hydrothermal treatment at 120° C. for two hours, dried at 110° C., pulverized, classified, and was then heat-treated at 400° C. for one hour to prepare a sample No. 4 which was then evaluated for its properties in the same manner as in Example 1. The results were as shown in Table 1.

Examples 5 and 6

Samples Nos. 5 and 6 were prepared by dispersing the sample SG-1 again in the water, hydrothermally treating it at 130° C. and 140° C. for 4 hours, followed by drying at 110° C., pulverization, classification and heat treatment at 400° C. for one hour. The samples Nos. 5 and 6 were evaluated for their properties in the same manner as in Example 1. The results were as shown in Table 1.

Comparative Examples 1 and 2

The sample No. SG-110 and the sample No. SG-1 were spray-dried at 110° C. to obtain samples Nos. H-1 and H-2 which were then evaluated in the same manner as described above. The results were as shown in Table 2.

Comparative Example 3

A silica gel available in the market was used as a sample No. H-3 had was evaluated in the same manner as described above. The results were as shown in Table 2.

Comparative Example 4

The sample of Example 4 that was not fired at 400° C. was used as a sample No. H-4 and was evaluated in the same manner as described above. The results were as shown in Table 2.

Comparative Examples 5 and 6

The samples of Examples 5 and 6 that were not fired at 400° C. were used as samples Nos. H-5 and H-6 and were evaluated in the same manner as described above. The results were as shown in Table 2.

Preparation of a stabilizing agent for beer on which are deposited alkali metal and alkaline earth metal By using NaOH and/or $CaSO_4$, sodium and/or calcium were deposited on the sample SG-1 in amounts of $5 \times 10^{-3}$ mol on the basis of $SiO_2$, which was then dried at 110° C. to obtain samples Nos. H-7 and H-8. The results were as shown in Tables 2 and 3.

Example 7

The sample No. H-8 was fired at 400° C. for one hour to obtain a sample No. 7 which was then evaluated for its properties in the same manner as in Example 1. The results were as shown in Tables 1 and 3.

TABLE 1

Figure 5:
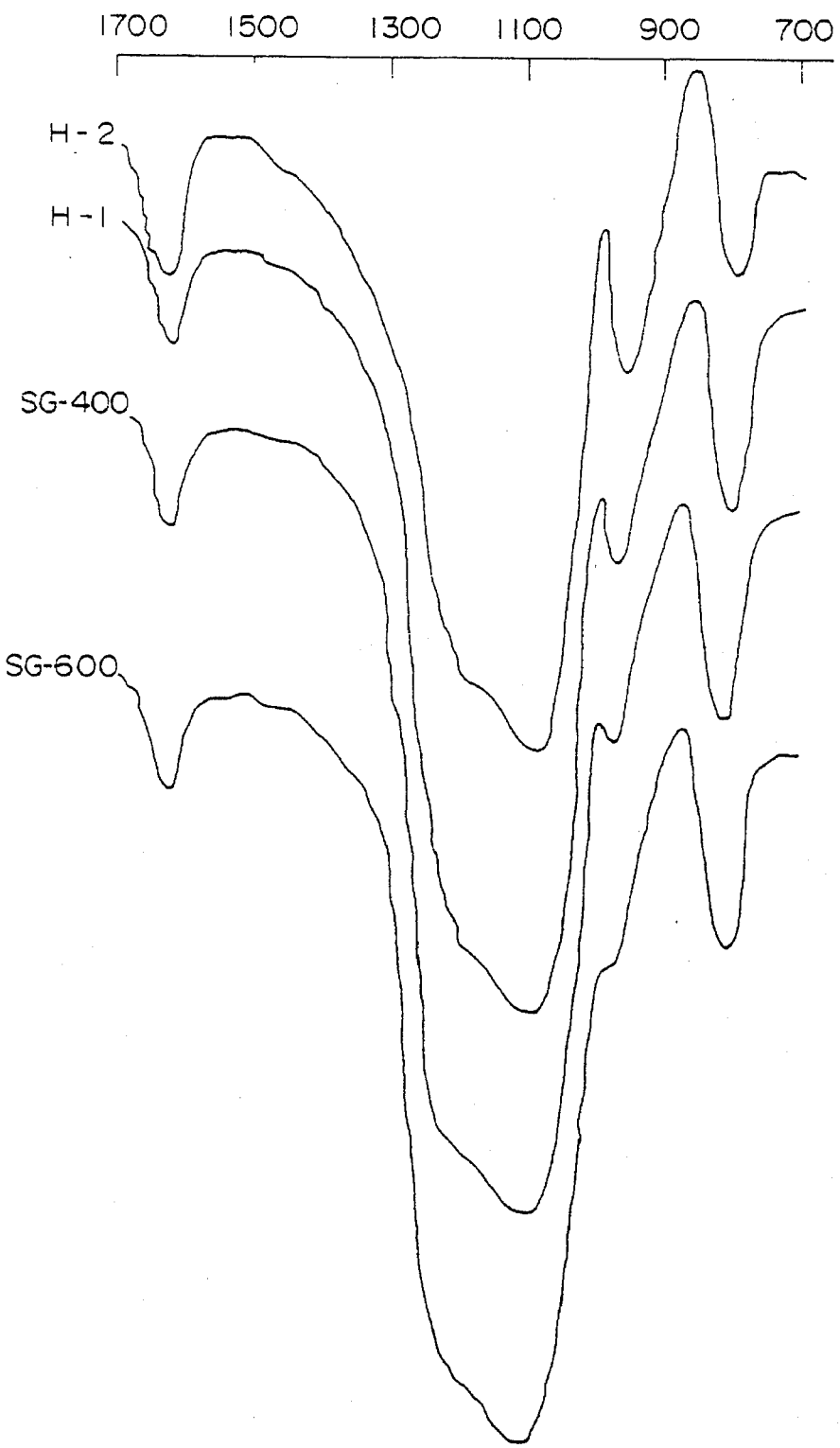
FIG. 5 illustrates infrared-ray absorption spectra of amorphous silica obtained according to embodiments of the present invention and Comparative Examples.

| Sample No. | Examples | | | | | | |
|---|---|---|---|---|---|---|---|
| | 1 | 2 | 3 | 4 | 5 | 6 | 7 |
| Water content (%) | 3.65 | 2.15 | 0.99 | 2.05 | 1.59 | 1.95 | 2.11 |
| pH (5% susp) | 5.62 | 5.11 | 4.51 | 6.71 | 6.66 | 6.62 | 7.43 |
| Electric conductivity (μS) | 32.4 | 28.2 | 23.2 | 12.9 | 12.4 | 12.1 | 72.9 |
| Bulk density (g/cc) | 0.229 | 0.229 | 0.231 | 0.253 | 0.237 | 0.222 | 0.277 |
| Average particle size (μm) | 6.23 | 6.06 | 5.94 | 5.68 | 5.59 | 5.51 | 5.25 |
| 2.6 μm or smaller (%) | 31.0 | 35.0 | 39.0 | 31.5 | 32.5 | 33.1 | 34.0 |
| Specific surface area (m$^2$/g) | 410 | 408 | 406 | 468 | 384 | 324 | 260 |
| Porous volume (cc/g) | 1.59 | 1.58 | 1.55 | 1.02 | 1.11 | 1.17 | 1.34 |
| Average porous size (nm) | 15.5 | 15.5 | 15.3 | 8.7 | 11.6 | 14.4 | 20.6 |
| Ig-Loss (%) | 3.27 | 1.81 | 0.96 | 2.91 | 2.50 | 2.29 | 2.23 |
| Number of OH (groups/nm$^2$) | 5.3 | 3.0 | 1.6 | 4.2 | 4.4 | 4.7 | 5.7 |
| Zeta-potential at origin (mV) | −35.5 | −44.3 | −51.9 | −41.8 | −42.6 | −42.5 | −37.5 |
| pH (at 1000 ppm/25° C.) | 5.71 | 5.62 | 5.55 | 5.72 | 5.68 | 5.79 | 5.87 |
| $R_A = I_{970}/I_{1100}$ | 0.16 | 0.10 | 0.05 | 0.13 | 0.12 | 0.11 | 0.11 |
| IR-spectral | — | FIG. 5 | FIG. 5 | — | — | — | — |
| Durability | 1.4 | 1.1 | 1.0 | 1.2 | 1.0 | 1.1 | 1.2 |
| Froth-holding property | +3 | +5 | +1 | +4 | +3 | +3 | +2 |

TABLE 2

| Sample No. | Comparative Examples | | | | | | | |
|---|---|---|---|---|---|---|---|---|
| | H-1 | H-2 | H-3 | H-4 | H-5 | H-6 | H-7 | H-8 |
| Water content (%) | 4.12 | 5.25 | 3.53 | 1.82 | 1.75 | 1.48 | 3.21 | 2.89 |
| pH (5% susp) | 5.89 | 7.10 | 6.52 | 6.67 | 6.59 | 6.54 | 9.10 | 7.62 |
| Electric conductivity (μS) | 37.9 | 25.0 | 147.3 | 14.3 | 13.9 | 13.2 | 38.2 | 87.2 |
| Bulk density (g/cc) | 0.229 | 0.540 | 0.301 | 0.256 | 0.239 | 0.222 | 0.268 | 0.277 |
| Average particle size (μm) | 6.25 | 18.10 | 7.85 | 5.81 | 5.72 | 5.66 | 5.21 | 5.31 |
| 2.6 μm or smaller (%) | 28.0 | 2.0 | 35.0 | 27.2 | 28.1 | 28.1 | 29.1 | 29.0 |
| Specific surface area (m$^2$/g) | 411 | 736 | 367 | 476 | 384 | 325 | 300 | 260 |
| Porous volume (cc/g) | 1.59 | 1.06 | 1.22 | 1.01 | 1.10 | 1.18 | 1.19 | 1.35 |
| Average porous size (nm) | 15.5 | 5.8 | 13.3 | 8.5 | 11.5 | 14.5 | 15.9 | 20.8 |
| Ig-Loss (%) | 4.19 | 7.02 | 2.22 | 3.92 | 3.48 | 3.11 | 3.79 | 4.05 |
| Number of OH (groups/nm$^2$) | 6.8 | 6.4 | 4.0 | 5.5 | 6.1 | 6.4 | 8.5 | 10.4 |
| Zeta-potential at origin (mV) | −27.5 | −25.2 | −41.6 | −28.8 | −29.1 | −30.8 | −34.1 | −26.5 |
| pH (at 1000 ppm/25° C.) | 5.75 | 5.98 | 6.28 | 5.84 | 5.78 | 5.87 | 6.98 | 5.98 |
| $R_A = I_{970}/I_{1100}$ | 0.21 | 0.28 | 0.015 | 0.21 | 0.21 | 0.22 | 0.22 | 0.20 |
| IR-spectral | FIG. 5 | FIG. 5 | | | | | | |
| Durability | 2.0 | 9.0 | 1.5 | 2.1 | 2.1 | 2.1 | 2.0 | 2.0 |
| Froth-holding property | ±0 | ±0 | −5 | −1 | ±0 | −2 | +3 | ±0 |

TABLE 3

| Sample No. | Settling amount | | Treating temperature (°C.) |
|---|---|---|---|
| | Na$_2$O | CaO | |
| H-7 | 0.2% | — | 110 |
| H-8 | 0.1% | 0.08% | 110 |
| 7 | 0.1% | 0.08% | 400 |

Measuring method

1. Specific surface area by the BET method

The specific surface area was measured by using an automatic BET specific surface measuring apparatus (Sorptomatic Series 1800 manufactured by Carlo-Erba Co.) for the sample prepared under the below mentioned conditions in accordance with the BET method which is based upon the nitrogen adsorption. Measurement was taken by making reference to the following literature, i.e., S. Brunauer, P. H. Emmett and E. Teller, J. Am. Chem. Soc., 60, 309, 1938.

The sample sufficiently dried at 150° C. was introduced in an amount of 0.5 to 0.6 g into a weighing bottle and was further dried at 150° C. for one hour to accurately weigh it. The sample was introduced into an adsorption sample tube, heated at 200° C., and was deaerated until the vacuum degree in the adsorption sample tube was 10 mm$^{-4}$ Hg. After left to cool, the adsorption sample tube was introduced into liquid nitrogen of about −196° C., and the amounts of nitrogen gas adsorption at 4 to 5 points between $pN_2/po=$ 0.05 to 0.30 ($pN_2$ is a nitrogen gas pressure, po is an atmospheric pressure at the time of measurement) were converted into adsorption amounts at 0° C. under 1 atm. and were substituted for the BET formula to find Vm [cc/g] (amount of nitrogen gas adsorption necessary for forming a single molecular layer on the sample surfaces). The specific surface area was then found in compliance with the following relation (2), Specific surface area SA=4.35×Vm [m$^2$/g]        (2)

2. Porous volume by the BET method

A volume of gas [(Vs)(cc)] adsorbed by the sample having porous radii of 0 to 300 angstroms under a saturated pressure was found through the same procedure as the one described in 1. above by using the automatic BET specific surface measuring apparatus (Sorptomatic Series 1800 manufactured by Carlo-Erba Co.) described in 1. above based on the nitrogen adsorption method, and a porous volume (Vp)(cc/g) was found in compliance with the relation (3), $$Vp(cc/g)=Vs \times 0.00155/w \qquad (3)$$

w: weight of the sample (g)

3. Bulk density

Measured in compliance with the method described in JIS K 6220, Section 6.8.

4. pH of aqueous suspension

The sample was suspended in an amount of 5 g in 100 ml of ion-exchanged water, stirred for 10 minutes, and the pH was measured using a pH meter at 25° C.

5. Electric conductivity

The suspension for measuring the pH was measured using a conductivity meter, model DS-12, manufactured by Horiba Co.

6. Measurement of water content

The sample was dried in an electric drier at 110° C. for 2.0 hours to find a reduction in the weight of the sample in order to measure the water content.

7. Median diameter and number distribution

The sample was suspended in an amount of 0.5 g in 100 ml of ion-exchanged water, treated with ultrasonic waves for one minute and, then, a 100-82 m aperture tube was mounted to take measurement in accordance with the Coulter method.

The percentage of number was calculated in regard to those particles smaller than 2.6 μm relying upon the result of the measurement.

8. Ignition loss and number of OH groups on the surface

The silica powder was dried in advance at 110° C. to remove the adsorbed water. The silica powder was then heated in an electric furnace at 1000° C. until the weight becomes constant to thereby find a reduction in the weight to measure the ignition loss. The number of OH groups on the surface was found according to the relation, i.e., number of OH groups/nm$^2$=[6.023×10$^{23}$/specific surface area (m$^2$/g)·(10$^9$)$^2$]×[2/18]×[ignition loss(%)/100].

9. Zeta-potential

A value of when 0.2 g of the sample was suspended in 200 ml of ion-exchanged water was regarded to be a value at the origin and, then, the pH was adjusted by using a 0.5N HCl solution. The suspension was dispersed with ultrasonic waves for 30 seconds, and the zeta-potential was measured using Laser Zee Meter, Model 501, manufactured by PEN-KEM Co.

10. IR measurement

Measured by using an infrared spectrophotometer, Model A-302, manufactured by Nippon Bunko Co. The sample to be measured was prepared by adding 0.4 mg of silica powder to 100 mg of KBr using a tablet-forming machine.

11. Definition of $R_A$

The ratio ($I_{970}/I_{1100}$) of a peak intensity ($I_{1100}$) at a wavelength 1100 cm$^{-1}$ to a peak intensity ($I_{970}$) at a wavelength 970 cm$^{-1}$ in the infrared-ray absorption spectrum was found by the method shown in FIG. 1 and was regarded to be $R_A$.

12. Durability of beer

The beer (sample) contained in a bottle (can) was submerged in the water maintained at a constant temperature of 60°±1° C. in an erected manner for 72 hours, cooled with the water, submerged in a cooling bath maintained at 0° C. for 24 hours, and was introduced into a cell of a turbidimeter to measure the turbidity at 0° C.

⊙ Unit: EBC

13. Froth-holding property

By using a sigma value obtained in compliance with a sigma value method disclosed in the analytical method of ASBC (American Society of Brewing Chemists), the froth-holding property was found according to the following relation, Froth-holding property=(sigma value of the beer)–(sigma value of Comparative Example H-2)

Measurement of sigma value

In a 800-ml separating funnel, the froth of beer breaks and is liquefied into a volume b at a temperature of 20° C. over a period of 225 to 230 seconds (t), and the remaining froth is liquefied into a value c. The sigma value is calculated from the following relation, Sigma value of the sample beer=t/{2.302 log [(b+c)/c]}

*Rounded off to represent by an integer.

According to the present invention, a heat-treated fine particulate amorphous silica is used as a stabilizing agent for beer to exhibit a large negative zeta-potential in a weakly acidic pH region close to the pH of the beer. It is therefore made possible to effectively remove cold haze precursors while maintaining the froth-holding property of beer at a good level and to improve fragrance-retaining property of the beer.

We claim:

1. A stabilizing agent for beer comprising amorphous silica having a composition represented by the following formula $$aM_{2/m}O \cdot SiO \cdot nH_2O \qquad (A)$$

wherein M denotes an alkali metal and/or an alkaline earth metal, m is a valency of a metal M, a is a number of from 0 to 5×10$^{-3}$ and n is a number of from 0 to 0.2, having a specific surface area of from 100 to 600 m$^2$/g and a porous volume of from 1.0 to 2.0 cc/g, and further having an absorbency ratio ($R_A$) as defined by the following formula $$R_A = I_{970}/I_{1100} \qquad (1)$$

wherein $I_{970}$ is a peak absorbency at a wave number of 970 cm$^{-1}$ in an infrared-ray absorption spectrum, and $I_{1100}$ is a peak absorbency at a wave number of 1100 cm$^{-1}$ in the infrared-ray absorption spectrum, of not smaller than 0.02 but smaller than 0.20, an aqueous suspension of said amorphous silica at a concentration of 1000 ppm and at a temperature of 25° C. exhibiting a pH of from 4 to 6.2 and producing a zeta-potential of negative polarity having an absolute value of not smaller than 20 mV, wherein said amorphous silica exhibits essentially no infrared-ray absorption at a wave number of 3760 cm$^{-1}$.

2. A stabilizing agent for beer according to claim 1, wherein, in the formula (A), the alkali metal is sodium and/or the alkaline earth metal is calcium.

3. A stabilizing agent for beer according to claim 1, wherein the amorphous silica contains surface OH groups and the number of OH groups on the surface of the amorphous silica is not larger than $7/nm^2$.

4. A stabilizing agent for beer according to claim 1, wherein said amorphous silica has a median diameter of from 5 to 8 μm as measured by the Coulter counter method and has a number distribution of secondary particles of not larger than 2.6 μm of from 30 to 60%.

5. A stabilizing agent for beer according to claim 1, wherein the amorphous silica has a specific surface area of from 250 to 550 $m^2/g$.

6. A process for the treatment of beer, which comprises contacting the beer with the amorphous silica stabilizing agent of claim 1.

7. A stabilizing agent for beer comprising amorphous silica containing surface OH groups and having a composition represented by the following formula $$aM_{2/m}O.SiO.nH_2O \qquad (A)$$

wherein M denotes an alkali metal and/or an alkaline earth metal, m is a valency of a metal M, a is a number of from 0 to $3\times10^{-3}$, and n is a number of from 0 to 0.2, having a specific surface area of from 250 to 550 $m^2/g$ and a porous volume of from 1.0 to 1.6 cc/g, and further having an absorbency ratio ($R_A$) as defined by the following formula $$R_A = I_{970}/I_{1100} \qquad (1)$$

wherein $I_{970}$ is a peak absorbency at a wave number of 970 $cm^{-1}$ in an infrared-ray absorption spectrum, and $I_{1100}$ is a peak absorbency at a wave number of 1100 $cm^{-1}$ in the infrared-ray absorption spectrum, of not smaller than 0.02 but smaller than 0.15, an aqueous suspension of said amorphous silica at a concentration of 1000 ppm and at a temperature of 25° C. exhibiting a pH of from 5 to 6.0 and producing a zeta-potential of negative polarity having an absolute value of not smaller than 30 mv, wherein said amorphous silica exhibits a maximum infrared-ray absorption peak at a wave number of 1100 $cm^{-1}$ and a smaller absorption peak at a wave number of 970 $cm^{-1}$ and essentially no infrared absorption at a wave number of 3760 $cm^{-1}$, and wherein the number of OH groups on the surface of the amorphous silica is not larger than $7/nm^2$.

8. A stabilizing agent for beer according to claim 7, wherein, in the formula (A), the alkali metal is sodium and/or the alkaline earth metal is calcium.

9. A stabilizing agent for beer according to claim 7, wherein the number of OH groups on the surface of the amorphous silica is not larger than $6/nm^2$.

10. A stabilizing agent for beer according to claim 7, wherein said amorphous silica has a median diameter of from 5 to 8 μm as measured by the Coulter counter method and has a number distribution of secondary particles of not larger than 2.6 μm of from 30 to 60%.

11. A process for the treatment of beer, which comprises contacting the beer with the amorphous silica stabilizing agent of claim 7.

12. A stabilizing agent for beer comprising amorphous silica containing surface OH groups and having a composition represented by the following formula $$aM_{2/m}O.SiO.nH_2O \qquad (A)$$

wherein M denotes an alkali metal and/or an alkaline earth metal, m is a valency of a metal M, a is a number of from 0 to $3\times10^{-3}$, and n is a number of from 0 to 0.2, having a specific surface area of from 250 to 550 $m^2/g$ and a porous volume of from 1.0 to 1.6 cc/g, and further having an absorbency ratio ($R_A$) as defined by the following formula $$R_A = I_{970}/I_{1100} \qquad (1)$$

wherein $I_{970}$ is a peak absorbency at a wave number of 970 $cm^{-1}$ in an infrared-ray absorption spectrum, and $I_{1100}$ is a peak absorbency at a wave number of 1100 $cm^{-1}$ in the infrared-ray absorption spectrum, of not smaller than 0.02 but smaller than 0.15, an aqueous suspension of said amorphous silica at a concentration of 1000 ppm and at a temperature of 25° C. exhibiting a pH of from 5 to 6.0 and producing a zeta-potential of negative polarity having an absolute value of not smaller than 30 mv, wherein said amorphous silica exhibits a maximum infrared-ray absorption peak at a wave number of 1100 $cm^{-1}$ and a smaller absorption peak at a wave number of 970 $cm^{-1}$ and essentially no infrared absorption at a wave number of 3760 $cm^{-1}$ and wherein the number of OH groups on the surface of the amorphous silica is not larger than $6/nm^2$ and the amorphous silica has a median diameter of from 5 to 8 μm as measured by the Coulter counter method and has a number distribution of secondary particles of not larger than 2.6 μm of from 30 to 60%.

13. A stabilizing agent for beer according to claim 12, wherein, in the formula (A), the alkali metal is sodium and/or the alkaline earth metal is calcium.

14. A process for the treatment of beer, which comprises contacting the beer with the amorphous silica stabilizing agent of claim 12.

* * * * *